United States Patent [15] 3,663,754

Hanna, Jr. [45] May 16, 1972

[54] COMMUNICATION SYSTEM HAVING MODULATOR FOR GENERATING ORTHOGONAL CONTINUOUS PHASE SYNCHRONOUS BINARY FSK

[72] Inventor: Drexel W. Hanna, Jr., Warminster, Pa.

[73] Assignee: Totuus Communications, Inc., Horsham, Pa.

[22] Filed: May 18, 1970

[21] Appl. No.: 38,277

[52] U.S. Cl. .............................178/66 A, 325/30, 325/163, 325/320

[51] Int. Cl. .......................................H03c 3/38, H04b 1/04

[58] Field of Search ..................179/15; 178/66, 67; 325/30, 325/163, 320; 331/179, 38; 332/23

[56] References Cited

UNITED STATES PATENTS

| | | | |
|---|---|---|---|
| 3,205,441 | 9/1965 | Likel | 178/66 |
| 3,223,925 | 12/1965 | Florac, Jr. et al. | 178/66 |
| 3,320,552 | 5/1967 | Glasser | 332/23 |
| 3,475,558 | 10/1969 | Cahn | 179/15 |

*Primary Examiner*—Robert L. Richardson
*Assistant Examiner*—Kenneth W. Weinstein
*Attorney*—Seidel, Gonda & Goldhammer

[57] ABSTRACT

A communication system includes a modulator that generates orthogonal continuous phase synchronous binary frequency shift keying signals derived from a single oscillator without narrowband filters. Digital countdown chains are used to derive all appropriate signals. A transmitter incorporating the modulator and a receiver are also disclosed.

7 Claims, 3 Drawing Figures

INVENTOR
DREXEL W. HANNA, JR.
BY
Seidel, Gonda & Goldhammer
ATTORNEYS

Patented May 16, 1972 3,663,754

3 Sheets-Sheet 2

INVENTOR
DREXEL W. HANNA, JR
BY
Seidel, Gonda & Goldhammer
ATTORNEYS

INVENTOR
DREXEL W. HANNA, JR.
BY
Seidel, Gonda & Goldhammer
ATTORNEYS

COMMUNICATION SYSTEM HAVING MODULATOR FOR GENERATING ORTHOGONAL CONTINUOUS PHASE SYNCHRONOUS BINARY FSK

This invention relates to a communication system with a uniquely programmed message and having a modulator generating orthogonal continuous phase synchronous binary frequency shift keying (FSK) signals. More particularly, this invention relates to a transmitter having a modulator for generating orthogonal continuous phase synchronous binary FSK using a single oscillator without narrowband filters.

The advantage of having orthogonal signals is well known. In particular, such signals have reduced cross talk and increased information handling capacity. It is the purpose of the present invention to provide a relatively inexpensive, reliable and straightforward transmitter having frequency shift keying. The transmitter is incorporated into a communication system having unique features hereinafter described.

In accordance with one aspect of the present invention, the appropriate FSK signals are derived from only one oscillator. The derived signals are phase shifted and their sine and cosine function derived. The sine and cosine functions are mixed so as to obtain sum and difference signals. The mixed signals are then summed to provide a first function related to the sum of the frequencies. Only the sum and difference of the two signals need be considered because their phase angles drop out due to the choice of starting time and signal source. One of the signals is inverted and then the two signals are again summed to provide a second function related to the difference of the two frequencies. The signals thus provided are orthogonally related at the clock rate; that is, each starts at zero phase angle with each period of the clock. Thus by gating these signals with the data synchronized by the clock, binary FSK signals with continuous phase at the keying point can be derived.

The modulation scheme described herein is incorporated into a transmitter for broadcasting information. Still further, a receiver for detecting the information is described herein. The receiver and transmitter combine to provide a unique communication system.

For the purpose of illustrating the invention, there is shown in the drawings a form which is presently preferred; it being understood, however, that this invention is not limited to the precise arrangements and instrumentalities shown.

Figure 1:
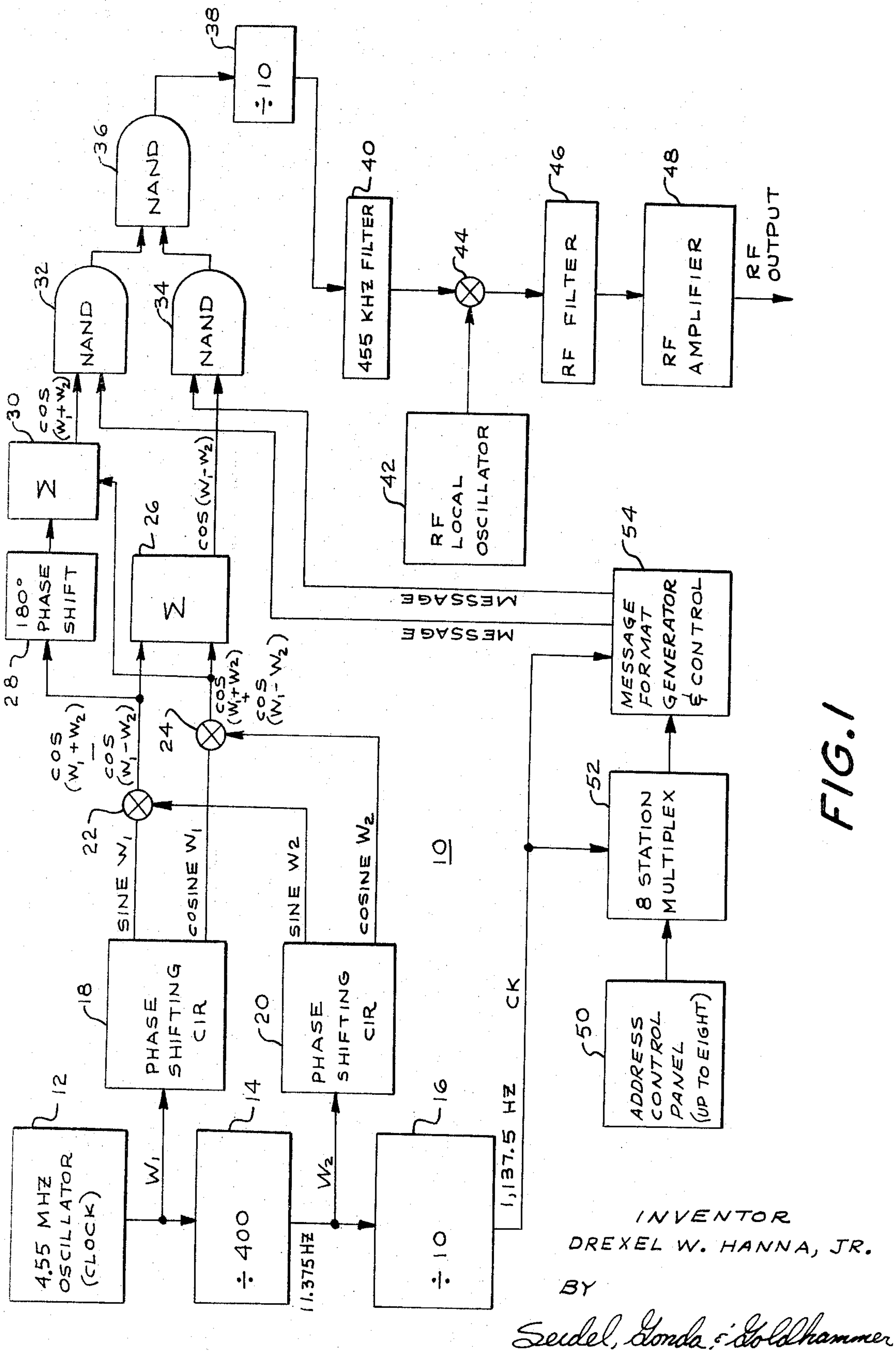
FIG. 1 shows a block diagram of a transmitter constructed in accordance with the principles of the present invention.

Referring now to the drawings in detail, wherein like numerals indicate like elements, there is shown a transmitter constructed in accordance with the present invention and designated generally as 10. As shown, the transmitter 10 includes a clock oscillator 12 which, by way of example but not limitation, generates a signal at a frequency of 4.55 MHz. The signal generated by the clock oscillator 12 is connected into a divide circuit 14 which, in the exemplary embodiment, is a divide by 400 circuit. The output of the divide circuit 14 is therefor at 11,375 Hz. This signal in turn is connected into a divide circuit 16 which, by way of example, divides the signal by 10. Thus, the output of the divide circuit 16 is the clock signal CK at 1,137.5 Hz.

For purposes of convenience, the signal output of the clock oscillator 12 will hereinafter be referred to as $W_1$, and the output of the divide circuit 14 will hereinafter be referred to as $W_2$. The output of clock oscillator 12 ($W_1$) is also connected into a phase shifting circuit 18 which shifts the phase of the signal by an amount equal to $\pi/2$. The output of the divide circuit 14 ($W_2$) is connected into a similar phase shifting circuit 20 which shifts the phase angle of the input signal by an amount equal to $\pi/2$.

The phase shifting circuit 18 generates a first signal proportional to sine $W_1$, and it generates second signal proportional to cosine $W_1$. In a like manner, the phase shifting circuit 20 generates a first signal proportional to sine $W_2$ and a second signal proportional to cosine $W_2$. The signals sine $W_1$ and sine $W_2$ are mixed in a conventional balance mixer circuit 22, whose output according to standard trigonometric functions is $$\tfrac{1}{2}\cos[(W_1+W_2)t+\alpha+\theta]-\cos[(W_1-W_2)t+\alpha-\theta]$$

Similarly, the signals cosine $W_1$ and cosine $W_2$ are mixed in the balance mixer 24. By applying trigonometric functions, the output becomes $$\tfrac{1}{2}\cos[(W_1+W_2)t+\alpha+\theta]+\cos[(W_1-W_2)t+\alpha-\theta]$$

In the latter two equations $\alpha$ is the phase angle between $W_1$ and the sinusoids produced by circuit 18; $\theta$ is the phase angle between $W_2$ and the sinusoids produced by circuit 20.

The aforesaid signals derived from the balance mixers 22 and 24 are connected into a summing circuit 26, which algebraically adds the output of the two mixers 22 and 24. The algebraic output is, according to conventional trigonometric functions:

$$\cos[(W_1-W_2)t\alpha-\theta]$$

The output of mixer 22 is also applied to the phase shifting circuit 28 which shifts the signal by a phase angle of 180°. The output of the phase shifting circuit 28 is applied to the summing circuit 30 as shown. In a like manner, the output of the mixer 24 is applied to the summing circuit 30. Summing circuit 30 algebraically adds the two signals. According to conventional trigonometric functions the output of the summing circuit is, therefore:

$$\cos[(W_1+W_2)t+\alpha+\theta]$$

Figure 2:
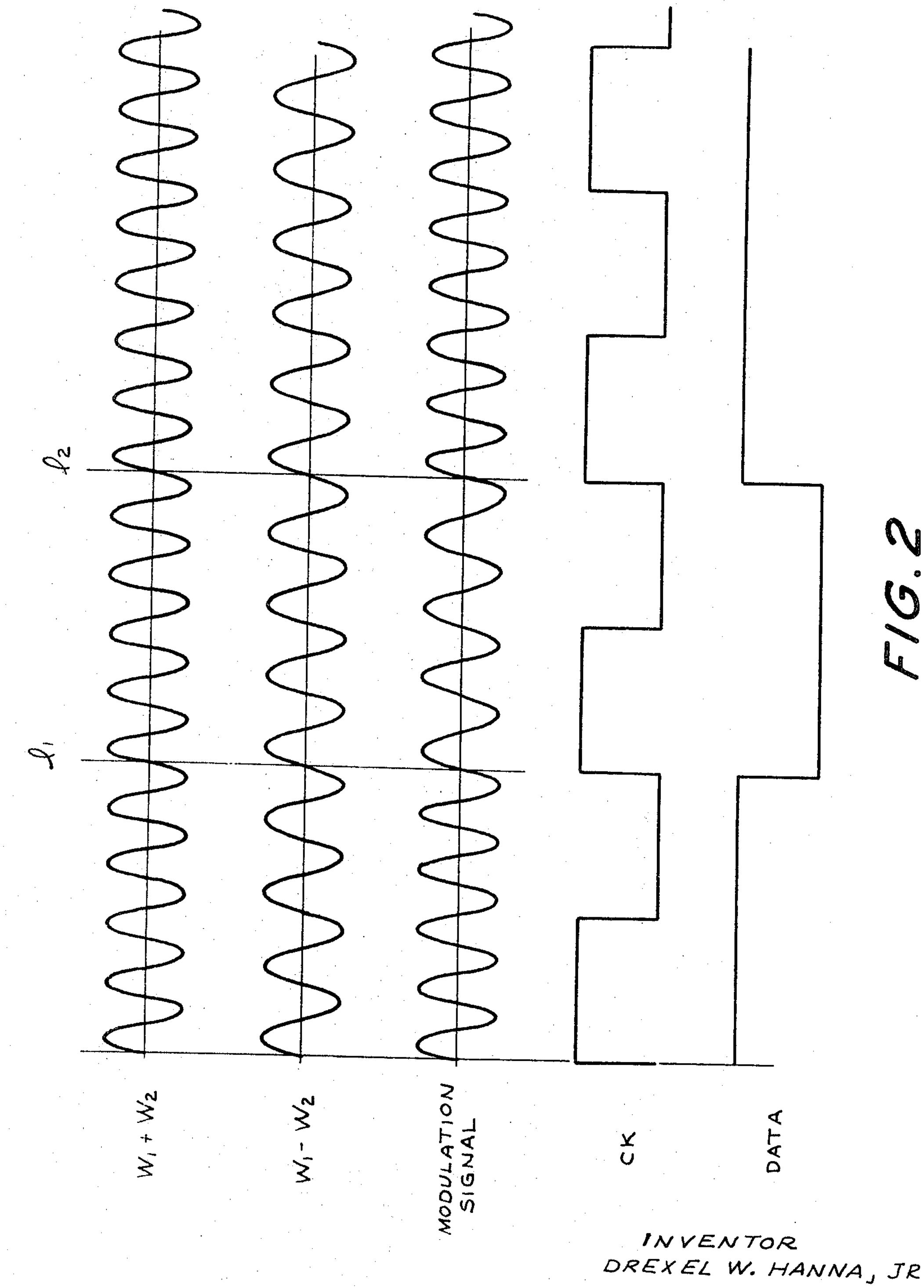
FIG. 2 is a graph illustrating the principles of the present invention.

Referring to FIG. 2, as well as the foregoing equations, it is apparent on inspection that the phase difference between the output signals of the summing circuits 26 and 30 is equal to two times $\theta$ at $t_o$). Moreover, both $\alpha$ and $\theta$ are equal to 0 if $W_2$ and the clock signal (CK) are derived from $W_1$. Accordingly, the simplified representations of the output signals as indicated in FIG. 1 are $\cos(W_1+W_2)$ for summing circuit 30, and $\cos(W_1-W_2)$ for summing circuit 26.

Thus, the orthogonal signals for modulation have been provided. Those skilled in the art can see that by adding mixers and countdown steps (dividers) additional tones can be generated.

As shown, the message format itself includes a conventional address control panel 50, a multiplexing device 52, which by way of example, but not limitation, may be an eight station multiplex, and a message format and control 54. The message format and control is preferably a pseudo-random generator, such as is described in my patent application entitled: Receiver For A Communication System, filed May , 1970. However, other format generators may be used.

The signal derived from divide circuit 16 is applied to the multiplexing circuit 52 and to the message format 54 and serves as clock signal CK. See FIG. 2. The output of the message format generator and control 54 consists of the binary message which is applied to one input of the NAND gate 32. The other input is $W_1+W_2$ as shown in FIG. 2. The inverted message signal is also derived from the generator 54 and applied to one input of the NAND gate 34. The other input is $W_1-W_2$ as shown in FIG. 2. The output of the NAND gates 32 and 34 are each applied to the NAND gate 36.

As illustrated in FIG. 2, a binary FSK signal will appear at the output of the NAND gate 36. Which signal appears depends only upon the message bit (Message or $\overline{\text{Message}}$) applied to the input of gates 32 and 34. Accordingly, the requisite orthogonal continuous phase synchronous binary FSK signal has been generated using a single oscillator. Phase continuity is obtained as a result of synchronizing the keying point to that time when $(W_1+W_2)$ and $(W_1-W_2)$ both go through zero phase. Note lines $l_1$ and $l_2$ in FIG. 2. Stated otherwise, within one cycle of the clock (CK) $W_1+W_2$ and $W_1-W_2$ are orthogonal; that is, they return to zero phase every period $\tau$ of the clock.

The processing of the signal derived from the output of NAND gate 36 is conventional. Thus, it is applied to a divide circuit 38, which preferably is a divide by 10 circuit. The signal is filtered in a 455 KHz filter 40 to obtain a 455 KHz sine wave and applied to the mixer 44. Within the mixer 44 the signal is mixed with a local radio frequency oscillator 42. The output of the mixer is applied to a radio frequency filter 46 and a radio frequency amplifier 48.

Figure 3:
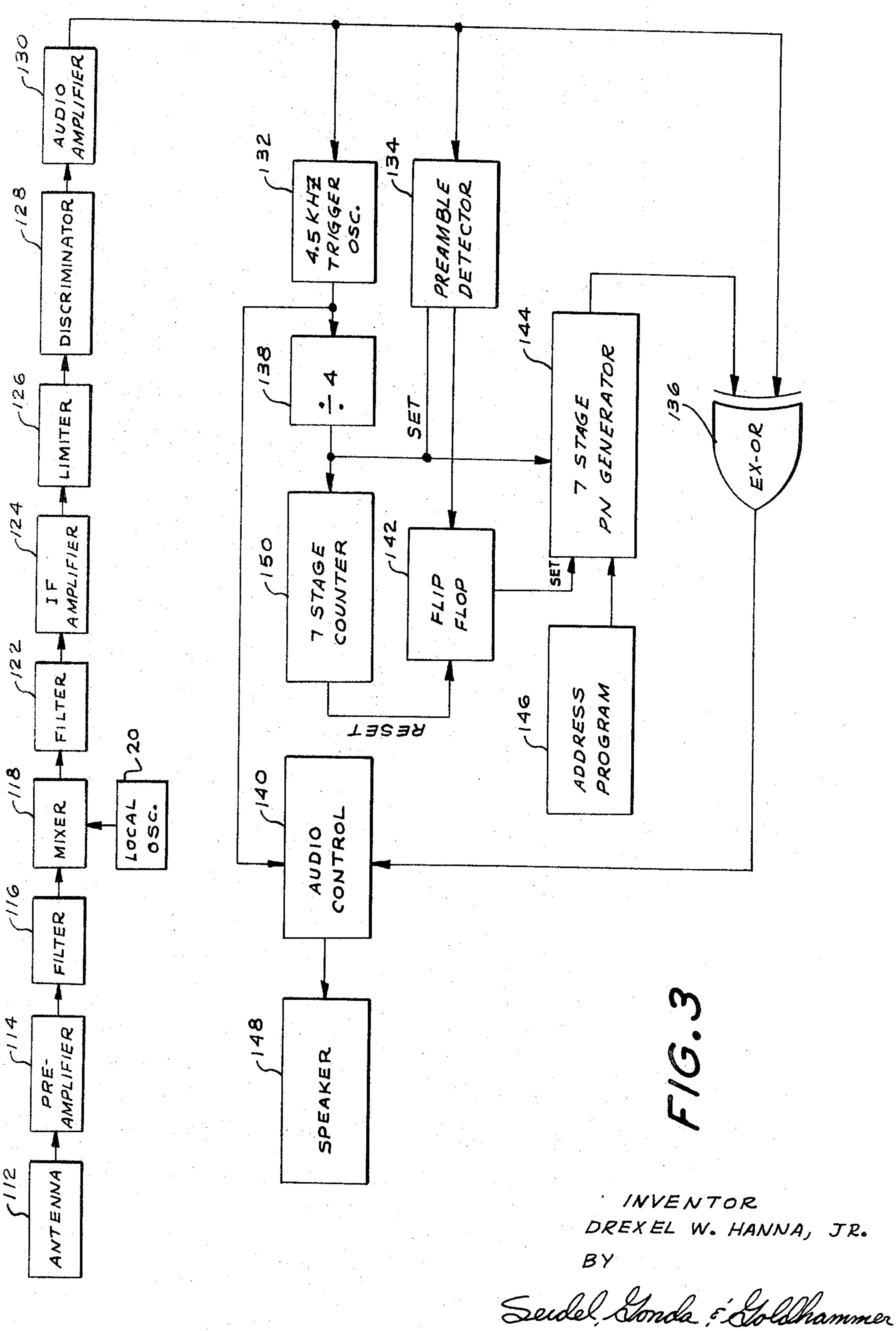
FIG. 3 is a block diagram of a receiver incorporating a pseudo-random sequence generator with an exclusive OR logic circuit that may be used with the transmitter.

The signal generated by the transmitter 10 is preferably detected by a receiver, such as the receiver described in my above-mentioned patent application. As illustrated in FIG. 3, the receiver includes an antenna 112 which may, if desired, be a ferrite antenna of the conventional type. The signal received by the antenna 112 is amplified by the preamplifier 114 and filtered by the filter 116. Filter 116 may be a crystal monolithic filter which performs a conventional preselection function. Thereafter, the signal is passed through a mixer 118 connected to local oscillator 120. The signal is further limited by a filter 122 and I.F. amplifier 124.

The signal derived from I.F. amplifier 124 is passed through a limiter 126 which preferably is of the two transistor type. Thereafter, the signal is passed through a discriminator 128. The limiter 126 performs its conventional function in that it removes unwanted amplitude variations. The discriminator 128 further removes unwanted frequency variations. The resulting audio frequency signal is amplified by audio amplifier 130 and passed to both the trigger oscillator 132 as well as the preamble oscillator 134. Still further, the signal is applied to one terminal of the exclusive OR circuit 136. As those skilled in the art know, an exclusive OR circuit is one for which the functional relationship is $$F(A, B) = (A+B)\ (\overline{AB})$$

Stated otherwise, its truth table differs from an OR circuit in that it has a 0 output when there is a matching signal on both of its inputs. A conventional OR circuit has a 1 output when there is a 1 signal on both of its inputs. It should be particularly noted that the detected signal is in all cases being applied to one terminal of the exclusive OR circuit 136.

The trigger oscillator 142 is triggered by the incoming signal, and it commences to generate a 4.55 KHz signal. This signal is passed through the divide circuit 138 which in the preferred embodiment is constructed to divide the signal by four. Thus, the resulting output of divide circuit 138 is a signal at 1,137.5 Hz. This lower frequency signal may be referred to hereinafter as the clock signal. As shown, the 4.55 KHz signal is also applied to the audio control circuit 140 whose purpose is explained in more detail hereinafter.

The preamble detector 134 preferably comprises a shift register with decode. Its function is to detect the preamble in the message and set the flip-flop circuit 142 as indicated in FIG. 3. Setting flip-flop circuit 142 generates a pulse which in turn starts the pseudo-random sequence generator 144 (hereinafter referred to as a PN generator). The function of a PN generator is to generate a code which is unique to the particular receiver 110 as described in my co-pending application. This particular code is applied to the other terminal of the exclusive OR circuit 136 as indicated. IF there is a match between the incoming signal applied to one terminal of the exclusive OR circuit and the signal generated by the PN generator 144, a 0 appears at the output of the exclusive OR circuit 136. This output is applied to the audio control circuit 140. The particular code unique to the receiver 110 is applied to the PN generator 144 by program circuit 146 which defines the starting state of the PN generator 44. Preferably, the program circuit 144 is permanently wired.

The audio control circuit 140 includes circuitry which responds to the output of the exclusive OR 136 to set a flip-flop circuit which turns on a gate circuit. The gate circuit in turn permits the 4.55 KHz signal to be applied to the speaker 148. The speaker transduces the signal into an audible signal. This signal, in the preferred embodiment of the invention, advises the listener that he is to perform a particular function. For example, it may be used to advise a salesman to call his office. It should be understood, however, that the speaker 148 is but one example of any type of transducer which may be used. Thus, the signal may be used to initiate a machine function, give an alarm, or perform any one of a number of types of remotely controlled operations.

The counter circuit 150 is synchronized by the clock signal derived from divide circuit 138. It counts up to a predetermined number (e.g., 128) and then triggers a reset pulse. This reset pulse is applied to flip-flop 142, causing it to return to its initial mode. This resets the PN generator to its starting state (defined by the wired program) and defines the time window of the receiver.

During the countdown period, the PN generator 144 goes through its preset sequence to determine whether or not there was a match with the incoming signal. The operation of the PN generator 144 is synchronized by a clock signal derived from the divide circuit 138 as indicated.

It should be apparent from the foregoing that the transmitter 10 and receiver 110 are uniquely related so that together they may define a communication system. A single transmitter 10 and single receiver 110 define a one-way communication system. However, a transmitter 10 can be combined with the receiver 110 so as to define a transceiver. A pair of transceivers therefore provide receiver two-way communication system. Still further, the transmitter 10 can be used to communicate with a large number of receivers 110, with each receiver having a unique pseudo-random generator and exclusive OR circuit for detecting a signal unique to it. Of course, the message format generator and control 54 should be capable of generating data signals unique to each of the several receivers. This can be accomplished by means of a soft program associated with a pseudo-random generator in message format generator and control 54. Still further, two or more transmitters 10 can be designed to communicate with a single receiver 110 with the receiver PN generator soft programmed for multiple messages.

The last described multiple transmitter-single receiver system could be used for any number of applications. For example, it could be used for river pollution control. In such a system each transmitter would be spaced along the length of a river. A particular transmitter would be triggered by a detector sensitive to a rise in the river content of a particular pollutant. The transmitter would generate a unique signal which would be detected by the receiver. Since only the down river detectors would sense the presence of a pollutant, the source is readily ascertained as being between the first down river transmitter to signal its presence and the last silent up river transmitter.

A transceiver system such as described herein may be used for air to air and air to ground traffic control and for signalling predetermined data. Of course, those skilled in the art will immediately recognize other unique applications.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for generating two or more tones having a known frequency separation, comprising only one oscillator for generating a clock signal, means for deriving at least two signals at different frequencies from said oscillator, means for shifting the phase of each derived signal and thereby generating signals proportional to the sine function and cosine function of each signal, means for mixing the cosine function signals of said phase shifted signals, means for mixing the sine function signals of said phase shifted signals, means for summing said mixed signals, means for shifting the phase of said mixed sine signal by 180°, means for summing said phase shifted mixed sine signal and said mixed cosine signal to derive signal frequency signals as a result of the combination.

2. Apparatus in accordance with claim 1 including a gating circuit to select a desired frequency.

3. In a transmitter including a apparatus for generating orthogonal continuous phase synchronous binary frequency shift signals, said modulator having means for generating two or more tones having a known frequency separation using only one oscillator, means for deriving at least two signals at different frequencies from said oscillator, means for shifting the phase of each derived signal and thereby generating signals proportional to the sine function and the cosine function of each derived signal, means for mixing the cosine function signals of said phase shifted signals, means for mixing the sine function signals of said phase shifted signals, means for summing said mixed signals, means for shifting the phase of said mixed sine function signal by 180°, means for summing said phase shifted mixed sine function signal and said mixed cosine function signal to derive single frequency signals as a result of the combination, and means for providing a clock signal for synchronizing said signals and data signals to be received by said transmitter.

4. A transmitter in accordance with claim 3 wherein said clock signal is derived from said oscillator.

5. A transmitter in accordance with claim 3 including a message format generator, said message format generator comprising a pseudo-random generator and a preamble generator, gating means, the output of said message format generator and the output of said modulator being coupled into said gating means.

6. In a transmitter including a apparatus for generating orthogonal binary shift keying signals, said modulator including apparatus for generating two or more tones having known frequency separation comprising only one oscillator, means for deriving at least two signals at different frequencies from said oscillator, means for shifting the phase of each signal and thereby generate signals proportional to the sine function and the cosine function of each signal, means for mixing the cosine function signals of said phase shifted signals, means for mixing the sine function signals of said phase shifted signals, means for summing said mixed signals, means for shifting the phase of said mixed sine function signal by 180°, means for summing said phase shifted mixed sine signal and said mixed cosine signal to derive single frequency signals as a result of the combination.

7. A transmitter in accordance with claim 6 including a message format generator, said message format generator comprising a pseudo-random generator and a preamble generator, gating means, the output of said message format generator and the output of said modulator being coupled into said gating means.

* * * * *